United States Patent
O'Neill (10) Patent No.: US 7,748,047 B2
(45) Date of Patent: Jun. 29, 2010

(54) PREVENTING FRAUDULENT INTERNET ACCOUNT ACCESS

(75) Inventor: David J. O'Neill, Falls Church, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1055 days.

(21) Appl. No.: 11/117,512

(22) Filed: Apr. 29, 2005

(65) Prior Publication Data

US 2006/0248600 A1 Nov. 2, 2006

(51) Int. Cl.
  *G06F 7/04* (2006.01)
  *G06F 17/00* (2006.01)
(52) U.S. Cl. .................. 726/29; 726/1; 726/27
(58) Field of Classification Search .......... 726/1, 726/27, 29; 713/182
  See application file for complete search history.

(56) References Cited

U.S. PATENT DOCUMENTS

| 6,202,156 | B1 | 3/2001 | Kalajan |
| 7,353,542 | B2 * | 4/2008 | Shiga et al. ............ 726/28 |
| 7,360,237 | B2 * | 4/2008 | Engle et al. ............ 726/1 |
| 2004/0083390 | A1 | 4/2004 | Cuenod et al. |
| 2004/0230807 | A1 | 11/2004 | Baird, III et al. |
| 2005/0044410 | A1 | 2/2005 | Yan |
| 2005/0044419 | A1 | 2/2005 | Jones et al. ............ 713/201 |
| 2005/0066043 | A1 * | 3/2005 | Wallman ............ 709/229 |

FOREIGN PATENT DOCUMENTS

EP  1246041 A  10/2002

OTHER PUBLICATIONS

Anonymous, "Authentication, Authorization and Access Control"[Online] May 12, 2001 (May 12, 2001), pp. 160-172, XP002538971, Apache HTTP Server Version 1.3, documentation Retrieved from the Internet: URL: http://www.apache-mirror.com/httpd/docs/apache-docs-1.3.23.pdf.zip>[retrieved on Jul. 27, 2009].

* cited by examiner

*Primary Examiner*—Matthew B Smithers
*Assistant Examiner*—Ali S Abyaneh (57) ABSTRACT

A method and system for authenticating requests for accessing network resources are described. Network address information may be associated with a network resource user. An authenticator may maintain the associated network address information. The authenticator may receive, from a requesting party, a request to authenticate the network resource user, where the request may include a network address identifier. The network resource user may be authenticated based on the network address information and the network address identifier. The authentication determination may be forwarded to the requesting party for purposes of controlling access to a network resource of a network resource provider in response to an access request made by the network resource user.

19 Claims, 4 Drawing Sheets

PREVENTING FRAUDULENT INTERNET ACCOUNT ACCESS

FIELD OF THE INVENTION

Implementations relate generally to computer network management and, more particularly, to systems and methods for security processing of requests for access to network resources.

BACKGROUND OF THE INVENTION

Network-enabled account services are available for many types of "accounts," including banking, investment, credit card, e-mail, and almost every conceivable type of traditional or network-based services that involve "owner" registration or subscription. Network-enabled account services provide remote access to personal account information and/or management capability via the Internet, for example, on a Worldwide Web ("web") site of an account administrator. Accordingly, authentication measures exist to restrict access or account privileges to a private account to only authorized users (e.g., account owner(s)).

To prevent unauthorized access, a user may be required, for example, to "log" into an account to access web content containing account information. Typically, logging into a specific account requires the user to enter valid, private account login information. The account login information can include a user name, user ID, login name, customer access number, e-mail address, or the like, along with a password, pass code, access code, personal identification number (PIN), codeword, or the like, which are uniquely associated with the specific account.

Currently, network-enabled account protection may be compromised when the account login information is made known to an unauthorized individual. Account login information can be ascertained by an unauthorized individual in a number of ways, for example, by a fraudulent practice known as "phishing." Phishing is the act of sending an e-mail to a user falsely claiming to be an established legitimate enterprise in an attempt to scam the user into divulging private information that may then be used for identity theft or unauthorized account access. Accordingly, existing account login processes alone are insufficient to prevent the unauthorized or fraudulent access to online account services.

SUMMARY OF THE INVENTION

According to one aspect, a method may include maintaining network address information associated with a network resource user; receiving a request to authenticate the network resource user, the request including a network address identifier; and authenticating the network resource user based on the network address information and the network address identifier.

According to another aspect, a method may include establishing an authorization list including at least one network address, the authorization list being associated with at least one network resource; receiving a request to access the at least one network resource, where the request includes a source network address; and controlling access to the at least one network resource based on the authorization list and the source network address.

According to another aspect, an apparatus may include a server configured to pre-authorize at least one network address to connect to the server; receive a request, from a client device having a source address, to connect to the server; determine whether the source address has been pre-authorized to connect to the server; and selectively grant the request based on the determination of whether the source address has been pre-authorized.

According to yet another aspect, a system may include means for receiving, from a client device having a dynamically assigned source network address from a range of network addresses, a request for connection to a network resource; means for selectively authenticating the source network address, where the source network address is compared to a list of authorized network addresses; and means for connecting an authenticated source network address to the network resource.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of embodiments of the principles of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention may provide access to a network resource of a network resource provider in response to an access request made by a network resource user. The network resource user may use one or more client devices that may have an associated network address identifier, e.g., a static network address or dynamically allocated network address allocated thereto by a network address identifier provider. Each network address associated with a particular client device requesting connection to the network resource may be authenticated, i.e., compared against network address information, e.g., a list of network addresses authorized for connection, by an authenticator. The network address information may include one or more ranges of network addresses from which the associated network address identifier may be dynamically allocated.

As used herein, a "range" or "list" may include one or more network identifier. The range may include any identifiable grouping. For example, the range of network addresses may include any discrete grouping of individual network addresses that may be inclusive or exclusive. The range may be defined by any suitable expression. In one implementation, the range may be defined by an algorithmic expression for a set of network addresses excluding one or more subset of network addresses from the set. In another implementation, the range may be defined by an algorithmic expression for a set of network addresses that may or may not be contiguous. The range may be defined as any function of one or more variables. Any suitable process may be used to determine the range.

EXEMPLARY NETWORK

Figure 1:
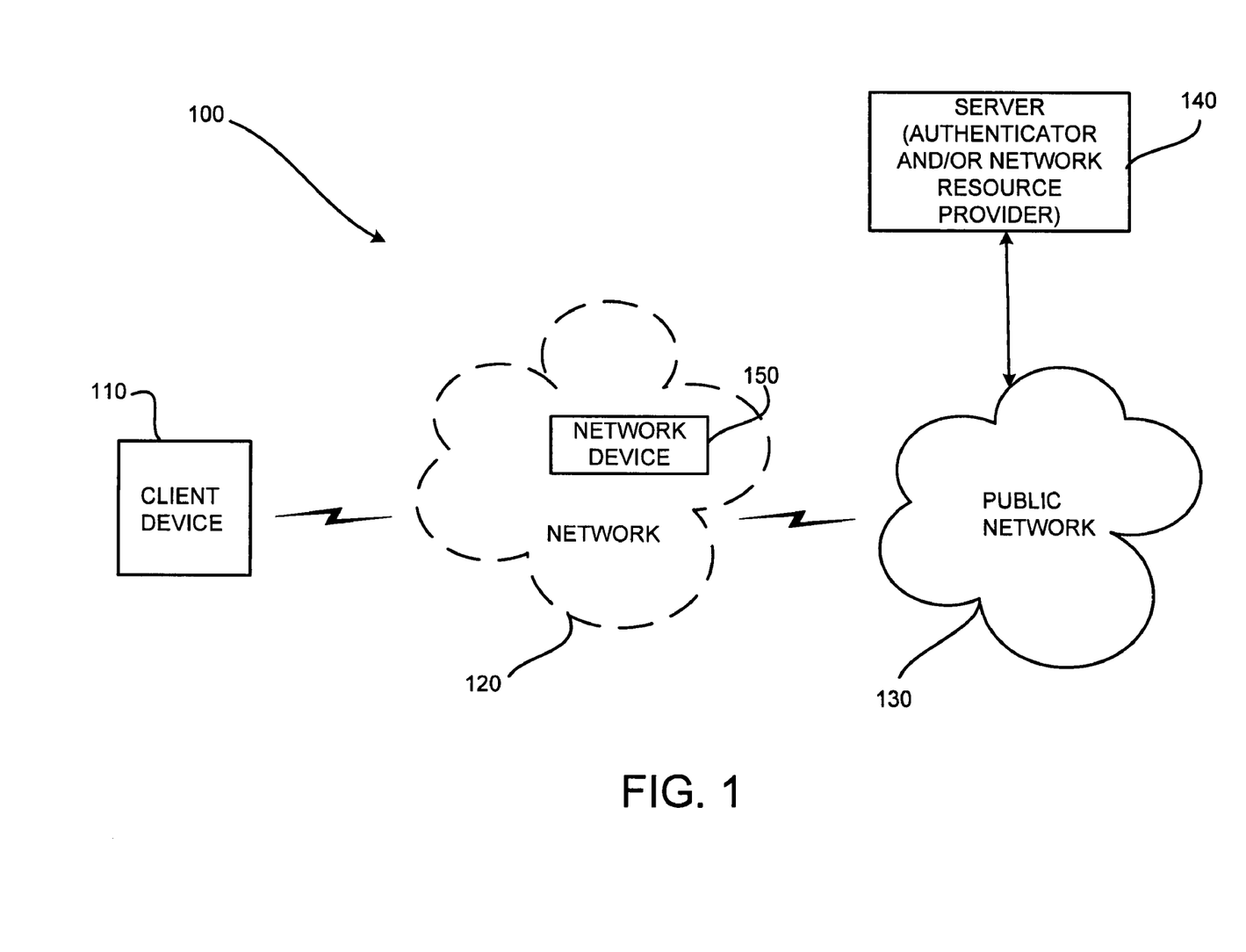
FIG. 1 is an exemplary diagram illustrating an exemplary network in which methods and systems consistent with the principles of the invention can be implemented.

FIG. 1 illustrates an exemplary network 100 in which systems and methods consistent with the principles of the invention may be implemented. As illustrated, network 100 may include a client device 110 that operatively connects with a public network 130 which may have an associated server 140. Network 100 may also include a network 120 that operatively connects with client device 110 and public network 130, and that may have an associated network device 150. The number and type of devices illustrated in FIG. 1 are provided for simplicity. In practice, a typical network in which the invention may be implemented could include more or fewer devices and/or networks than what is illustrated. In addition, devices depicted as single entities may be implemented in a distributed arrangement.

In one implementation consistent with principles of the invention, client device 110 may include any user or subscriber device capable of interacting with networked devices via a unique network identifier such as a network address (e.g., an IP address), as described in more detail below. Client device 110 may include a device, such as a personal computer, a laptop, a personal digital assistant (PDA), or another type of computation or communication device capable of initiating, transmitting, and/or receiving data and/or voice communications or other media via network 120 and/or public network 130.

Although only one client device 110 is shown, it should be understood that the number and type of client devices 110 illustrated in FIG. 1, is provided for simplicity. In practice, network 100 may include any number and type of client devices 110, for example, in a virtual and/or physical client group. The client group may be any association of client devices 110, for example, according to a designated commonality among individual client devices 110. The designated commonality may include any perceived or actual shared characteristic, including geographic location, network configuration (e.g., local area network (LAN), wide area network (WAN), etc.), telephone area code, telephone exchange, and/or subscriber specific information, for example, established by a service provider.

Network 120 may include a computer network of any type suitable for receiving, storing, processing, and/or transmitting any type of machine-readable data having substantially any format (e.g., bit, byte, chunk, packets, discrete units, etc.), among nodes or network elements in networked communication, having any suitable topology (e.g., bus, star, ring, etc.), protocol (e.g., IP, Ethernet, token-ring network, etc.), and architecture (e.g., peer-to-peer, client/server, etc.). For example, network 120 may include a proprietary network (e.g., a corporate network), a private network, a LAN, a WAN, a home-area network, an intranet, the Internet, a service provider's network, a voice over IP (VoIP) network, and/or a combination of networks. Network 120 may include one or more network devices 150 and/or systems cooperatively operating to receive, send, and/or transport data or other media. For example, network device 150 may include a router, a network switch, a firewall, a database, a gateway, a server, a network operations center (NOC), etc.

According to one implementation, network 120 may function as an access network that may provide client device 110 with connectivity to network resources. For example, client device 110 may be operated by a residential user to gain access to a service provider network using a link and network device 150. A link may include a broadband connection, such as a digital subscriber line (DSL) connection provided over, for example, shielded twisted pair, a cable modem connection provided over, for example, coaxial cable and/or optical fiber, and/or a wireless connection provided over, for example, a wireless fidelity (Wi-Fi) link and/or free-space optical link.

Network 120 may be operated by a service provider, such as a telecommunications provider, a cable television provider, or a multi-media firm. Network 120 may operate to communicatively couple client device 110 to a public network, such as public network 130. For example, network 120 may be implemented as a LAN servicing a residential community, such as a neighborhood. A residential user residing in the neighborhood may operate client device 110 to access public network 130 via network 120. The residential user may subscribe to network access services via a service provider associated with network 120.

Network 120 may be a network address identifier provider. Network 120 may statically or dynamically provide client device 110 with a network address or identifier, such as an IP address, an Ethernet address, a universal resource identifier (URI), a dynamic network service (DNS) identifier, etc., for use in identifying client device 110 to other networked devices. For example, network device 150 may be a network address identifier provider, and may include a dynamic host configuration protocol (DHCP) server, an address-translation gateway, a proxy server, and/or another type of server that provides a network address to client device 110 (when client device 110 initiates message transmission via network 120 and/or public network 130) to uniquely identify client device 110 to public network 130. The network address may be provided from associated or related network addresses assigned or available to network 120 or public network 130, as a group or range of network addresses.

Public network 130 may include networked resources, including associated hosts, nodes, and/or servers, such as server 140, in networked communication using, for example, a network addressing system, having any suitable topology, protocol, and architecture. Public network 130 may include one or more network devices and/or systems cooperatively operating to receive, send, and/or transport data, including routers, network switches, firewalls, databases, gateways, servers, network operations centers (NOCs), etc.

Server 140 may include any server device that processes, searches, and/or maintains information which may be accessible and/or networked to client device 110. For example, server 140 may include or be a network resource provider associated with destination network resources, such as files, network addresses, or the like, including web content such as web sites, web pages, online services, etc. As another example, server 140 may include or be an authenticator for authenticating requests for accessing network resources of the network resource provider. The authenticator may include an authentication authority or entity, system, operation, device, software, hardware, or process that may be associated with or independent of the network resource provider. Server 140 may interact with client device 110, for example, using hypertext transfer protocol (HTTP).

Figure 2:
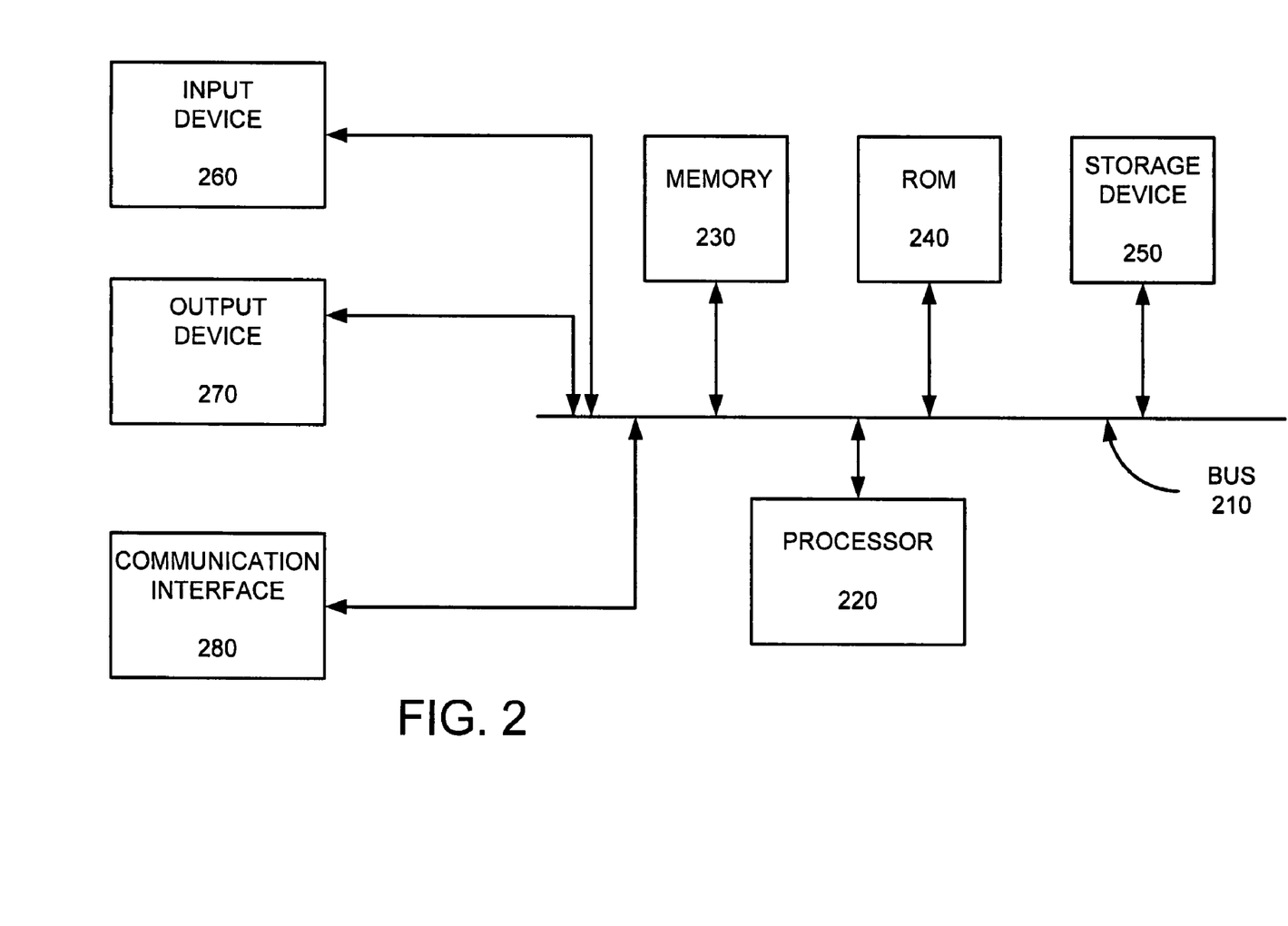
FIG. 2 is an exemplary block diagram of the server and/or client device of FIG. 1 according to an implementation consistent with the principles of the invention.

FIG. 2 illustrates an exemplary configuration of client device 110 and/or server 140 in an implementation consistent with the principles of the invention. Other configurations may alternatively be used. Client device 110/server 140 may include a bus 210, a processor 220, a memory 230, a read only memory (ROM) 240, a storage device 250, an input device 260, an output device 270, and a communication interface 280. Bus 210 permits communication among the components of client device 110/server 140.

Processor 220 may include any type of conventional processor, microprocessor, or processing logic that interprets and executes instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a conventional ROM device and/or another type of static storage device that may store static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to client device 110/server 140, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables client device 110/server 140 to communicate with other devices and/or systems. For example, communication interface 280 may include a modem or an Ethernet interface to a LAN. Alternatively, communication interface 280 may include other mechanisms for communicating via a network.

Exemplary Processing

Figure 3:
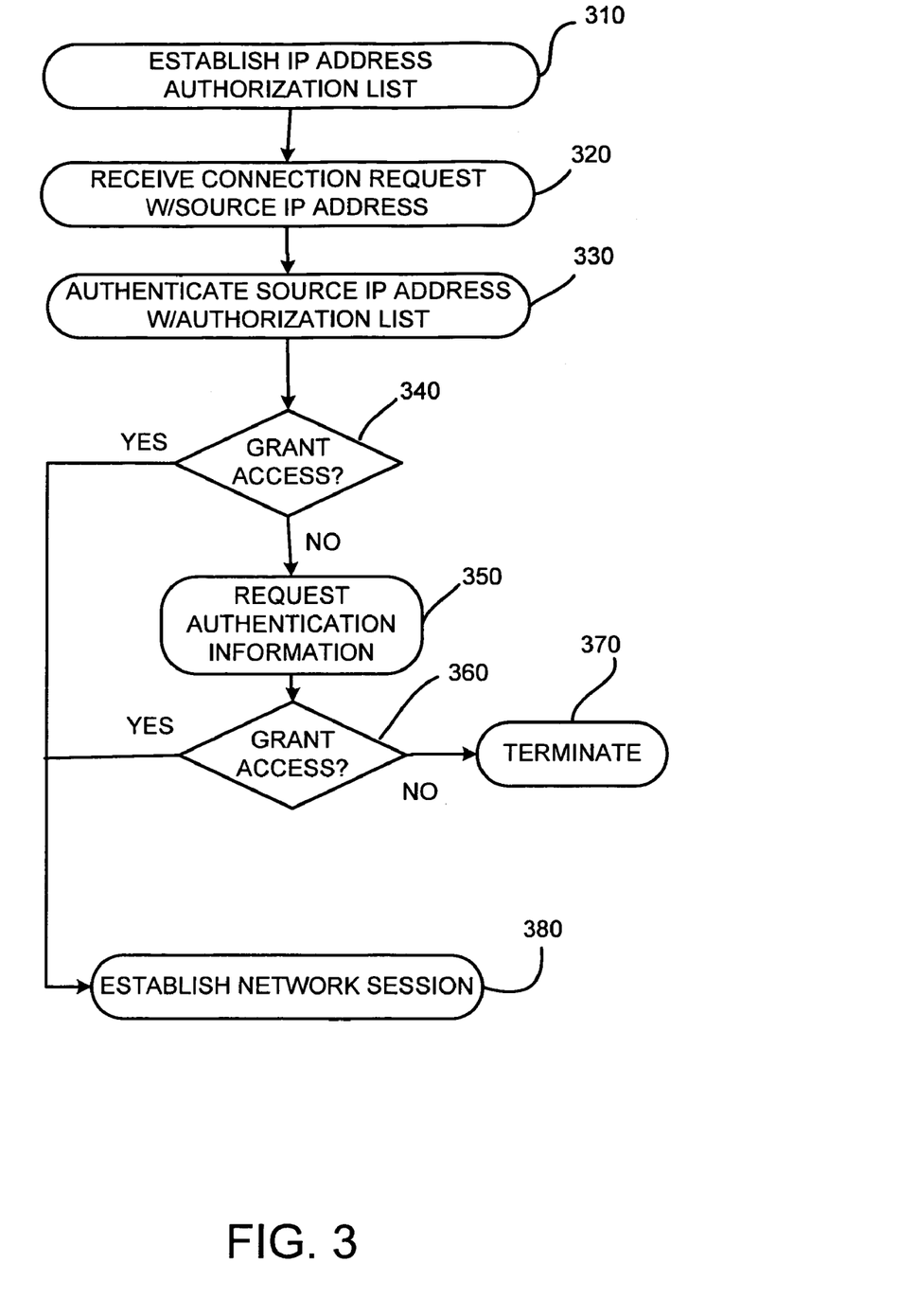
FIG. 3 is an exemplary flow diagram illustrating a method for authenticating prospective users of network-enabled account services consistent with the principles of the invention.

FIG. 3 is a flowchart of exemplary processing for preventing unauthorized use of network-enabled resources and/or services according to an implementation consistent with principles of the invention. Processing may begin with a network resource user, such as an owner, and/or network resource provider or administrator of a network-enabled resource (e.g., an account), independently or cooperatively pre-authorizing access to the network resource by establishing an authorization list of one or more network addresses from which the associated network resource may be accessed, for example, via public network 130 (operation 310). The authorization list may include one or more ranges of network addresses. The authorization list may be maintained by the network service provider and/or an authenticator, for example, in server 140 (e.g., in memory 230, storage device 250, etc.). As discussed above, the network resource may be associated with server 140 (e.g., processor 220, memory 230, storage device 250, etc.).

The authorization list may be established by any suitable process, initially, for example, as part of the account setup or registration process, or at any time thereafter. According to an exemplary implementation, the account owner(s) may identify a specific network address(es) and/or discrete range(s) of network addresses known to the account owner(s), from which the account owner(s) intends to access the account. According to another exemplary implementation, the account owner(s) may identify one or more select entities associated with client devices 110 which the account owner(s) intends to use to access the account, without the need to specify the associated network addresses (which may be unknown to the account owner(s)). For example, the account owner(s) may provide information, such as an employer, a network service provider, and/or select any other network address identifier provider for which the associated network addresses are "on file" or can be obtained by the network resource provider. According to yet another exemplary implementation, for an existing account, a network address(es) previously used to access the account can be "grandfathered" into the authorization list. For example, the account owner(s) and/or the network resource provider can designate an identifiable network address(es) from which the account has been accessed by an authorized network resource user. In one implementation, the authorization list may be populated automatically.

In an exemplary implementation, a network address(es) may be provisionally included in the authorization list. For example, a provisional network address(es) may assume authorized and non-authorized status for specified periods. For example, a provisional network address(es) otherwise on the authorization list, may have predetermined days of the week and/or times of the day, etc., for which the provisional network address(es) has access authorization. As another example, a network address(es) may be designated with a "sunset" provision, for instance, having a predetermined expiration date/time, after which it is automatically, permanently or temporarily removed from the authorization list. Consistent with the principles of the invention, a network address(es) on the authorization list may have any other provisional or conditional status associated therewith, such as a delayed onset or activation. As another example, a network address(es) may be limited to viewing account information, and restricted from transacting. According to another exemplary implementation, the network authentication functionality, consistent with the principles of the invention, may be selectively disabled altogether for a designated period (e.g., when the account owner(s) is on travel), during which the network resources may be accessed from network addresses not on the established authorization list.

In another exemplary implementation, an established authorization list may be revised one or more times by the account owner(s), network resource provider, or both, in any manner described above for establishing the authorization list, as well as any other suitable process. That is, the original authorization list of network addresses may be updated or modified by deleting existing or previously added network addresses, and/or adding additional network addresses, including subsets or ranges of network addresses.

Subsequently, client device 110 may transmit an access request, through public network 130 directly, or indirectly through network 120, to a network device, such as server 140 (operation 320). The access request may include a static or dynamically assigned network address as a source network address associated with client device 110. The access request may request connection to a destination network resource(s), such as a file(s), a network address(es), etc., associated with server 140. In one implementation, access to the network resource(s) may be controlled by the authenticator authenticating the access request. Authentication may be based on a determination of whether the source network address is authorized to connect to the requested destination network resource. Authentication may include a comparison of the source network address against the authorization list, for example, by server 140 (operation 330).

In one exemplary implementation consistent with principles of the invention, server 140 may selectively grant the access request where the source network address is reflected or represented in the authorization list, and deny the access request where the source network address is not reflected or represented in the authorization list. Upon determining that the source network address is authorized, the requested connection can be made to thereby establish a user or network session between client device 110 and server 140, for example (operation 380).

According to another exemplary implementation, upon a determination that the source network address is not authorized, an indication can be made, for example, by server 140, that access has been denied or restricted, which can be transmitted to client device 110, along with a request that the user of client device 110 provide (additional) predetermined authenticating information (operation 350). For example, the user may provide biometric data, such as fingerprint or voiceprint verification data, to the authenticator by any suitable communication system. As another example, the user may verbally communicate the verification information to the authenticator via any suitable telecommunications device. Access can thereafter be denied or granted based on the response received, for example, by server 140 (operations 360, 370, and 380).

In one exemplary implementation consistent with principles of the invention, establishing the network session may alternatively or additionally require that valid login information be received, for example, at server 120, before, after, or concurrently with the authentication process described herein. For example, the user of client device 110 may be prompted by a message from server 140 to enter login information (e.g., username and password, etc.) before or after operation 310 or before or after operation 380. Failure to receive valid login information may prevent the authentication process, terminate the network session, or both.

In another exemplary implementation, at least one discrete range of network addresses can be associated with client devices 110 of a particular client group. As discussed above, members of the group (i.e., client devices 110) may be determined based on a shared characteristic, a geographic region, a telephone number region, a network configuration, etc. associated with client devices 110. For example, a service provider, such as an Internet service provider (ISP), may form groupings of client devices 110 for purposes of assigning network addresses to individual client devices 110 in the client group. In this manner, the pool of possible network addresses for any given client device 110 can be reduced, for example, to a manageable number of discrete network address ranges such that the account owner(s) may add the network address range(s) to the authorization list. In this manner, the number of client devices 110 from which the destination network resource(s) can be accessed may be substantially reduced, thus decreasing the likelihood of fraudulent access to the network resource(s).

EXAMPLES

Figure 4:
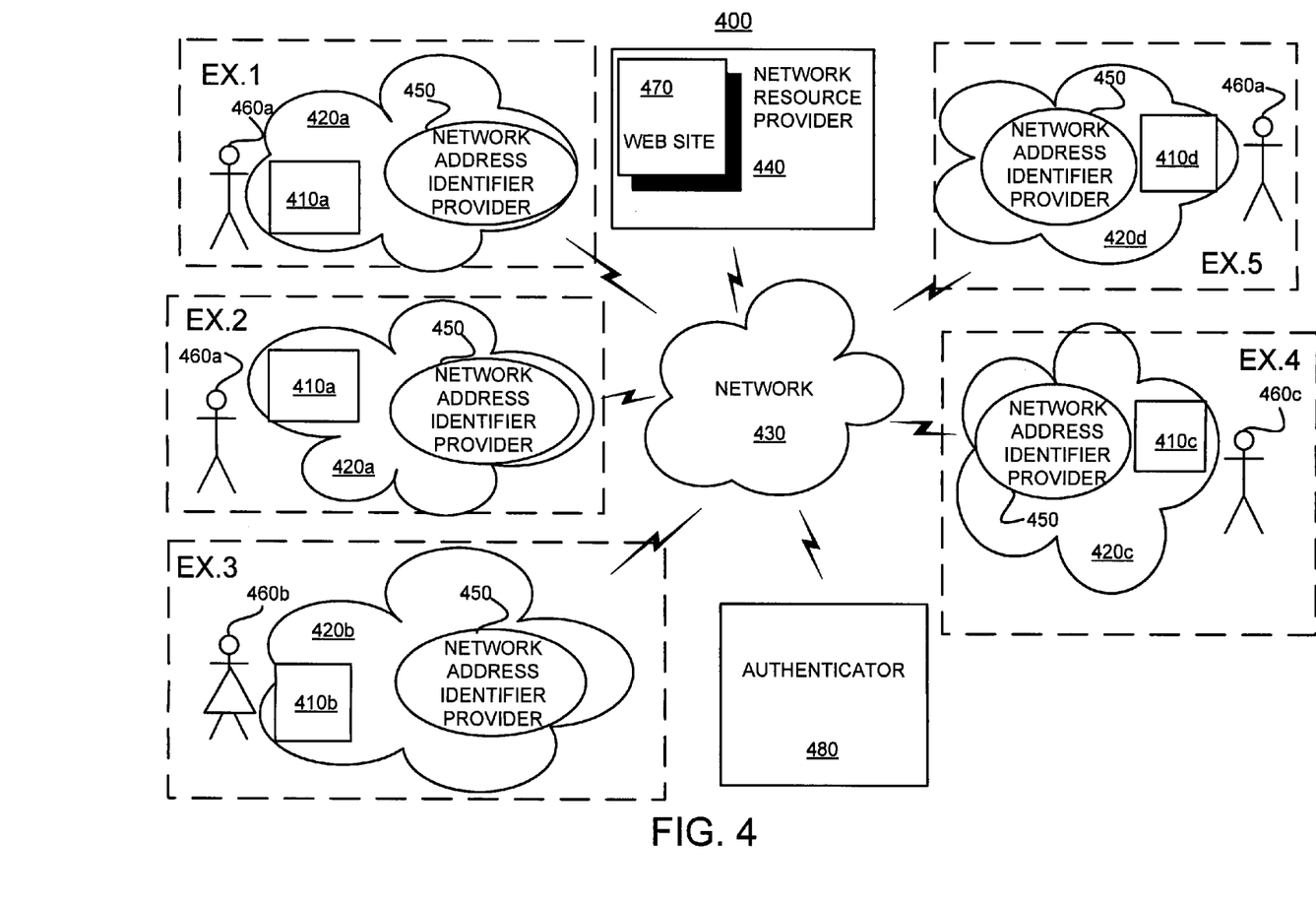
FIG. 4 is another exemplary diagram illustrating an exemplary network in which methods and systems consistent with the principles of the invention can be implemented.

FIG. 4 illustrates an exemplary network 400 in which various systems and methods consistent with the principles of the invention may be implemented. For each of the following exemplary implementations, network resource users (e.g., co-account owners) 460a and 460b have a network-enabled account identified by a destination network address(es), e.g., web site 470. The account may be hosted by a network resource provider 440. The account at web site 470, is accessible to authorized network resource users (here, users 460a, 460b), and inaccessible to unauthorized network resource user(s) (here, phisher 460c), using multi-level security processing (e.g., source authentication, login validation, security verification, etc.) by network resource provider 440 and an authenticator 480 via a network 430, consistent with the principles of the invention. The account at web site 470 has an associated established authorization list that includes pre-authorized source network addresses that are allowed to connect to the account at the destination network address(es). The account also has associated login information that is required for account access validation. Private account information (e.g., a social security number, a driver's license number, mother's maiden name, biometric data, etc.) that is not likely to be discovered by phishing techniques, may be maintained by or accessible to authenticator 480 and/or network resource provider 440 for providing secondary authenticity verification. Consistent with principles of the invention, the authentication process may be intentionally bypassed or disabled for a predetermined period(s) as directed by an authorized network resource user.

Example 1

In one exemplary implementation, illustrated in Ex. 1, a first co-owner of the account, network resource user 460a, uses a computer 410a (or another networked device (not shown)) that is networked on a corporate LAN 420a, for example, at his place of business, to transmit an access request to web site 470 associated with network resource provider 440. LAN 420a is a Class C network that has an IP address having a 24 bit network prefix or segment, e.g., 192.34.242, and computer 410a has an assigned specific host or node number (e.g., 118). According to one implementation, where network resource user 460a intends to access the account at web site 470 only from computer 410a (e.g., his assigned computer), the authorization list may include the IP address, 192.34.242.118. In another implementation, where network resource user 460a intends to access the account from one or more other computers on LAN 420a, the individual IP address(es) may be included in the authorization list or, alternatively, the entire network (or any subset(s) thereof) may be represented in the authorization list as 192.34.242.0-192.34.242.255. Thus, the IP address, 192.34.242.118, allocated by network address identifier provider 450, and associated with an access request received from network resource user 460a using computer 410a on LAN 420a via network 430 at web site 470, is communicated to authenticator 480 for authenticating against the authorization list. Authenticator 480 communicates that authenticity has been established for network resource user 460a to network resource provider 440, and connection is allowed to the account IP address. Network resource user 460a then may proceed to log into the account by entering valid login information, to thereby establish a user session providing account access.

Example 2

In another exemplary implementation, illustrated in Ex. 2, the IP address of computer 410a is provisionally included in the authorization list. That is, the IP address, 192.34.242.118, allocated by network address identifier provider 450, is authorized only during certain periods (e.g., on business days, during normal business operating hours, etc.). When network resource user 460a attempts to use computer 410a to access the account at a time outside of the authorized period (e.g., on a weekend, etc.), authenticator 480 initially determines that network resource user 460a is unauthorized and communicates to network resource provider 440 that authenticity has not been established. Thus, the access request is rejected and connectivity is not allowed. A request denied message is sent to computer 410a. In one implementation, network resource user 460a may then provide secondary verification information that is verified against the related verification information maintained by or accessible to authenticator 480 and/or network resource provider 440. For example, network resource user 460*a* provide biometric data that is provided to authenticator 480, and/or use telecommunications to communicate with the authenticator and provide verification verbally and/or by touch-tone, etc. Once verified, network resource user 460*a* then may proceed to log into the account by entering valid login information to thereby establish a user session providing account access. In another implementation, network resource user 460*a* may then be given the option to modify the authorization list in view of the secondarily authenticated use of computer 410*a*.

Example 3

In another exemplary implementation, illustrated in Ex. 3, a second co-owner of the account, network resource user 460*b*, uses a computer 410*b* from her home that connects to an ISP network 420*b*, to transmit an access request to web site 470 associated with network resource provider 440. ISP network 420*b* is a Class B network that has an IP address having a 16 bit network prefix, e.g., 168.233, and computer 410*b* may have host number ranging from 0.0-255.255 that is dynamically allocated by network address identifier provider 450, for example, each time computer 410*b* initiates a connection to network 430. According to one implementation, the authorization list may include the IP address range, 168.233.0.0-168.233.255.255. According to another implementation, ISP network 420*b* may be subnetted, i.e., the single network may be split into multiple virtual networks. For example, ISP network 420*b* may include an associated group of networked devices (not shown) that includes computer 410*b*, which may be assigned an IP address in the range, 168.233.15.0-168.233.22.255. Accordingly, the authorization list may include the associated range of IP addresses. Thus, a dynamically assigned IP address in the range, 168.233.15.0-168.233.22.255, associated with an access request received from network resource user 460*b* using computer 410*b* on ISP network 420*b* via network 430 at web site 470, is communicated to authenticator 480 for authenticating against the authorization list, and connection is made to the account IP address. Network resource user 460*b* then may proceed to log into the account by entering valid login information to thereby establish a user session providing account access.

Example 4

In another exemplary implementation, illustrated in Ex. 4, a phisher, network resource user 460*c*, has acquired the login information for an account at web site 470 associated with network resource provider 440, through phishing or other techniques. Network resource user 460*c* uses a network device 410*c* that connects to a network 420*c* that is not LAN 420*a*, ISP (subnetted) network 420*b*, or any other network associated with the established authorization list, to transmit an access request to web site 470. The access request is communicated to authenticator 480 which authenticates the access request by comparing the associated source IP address allocated to network device 410*c* by network address identifier provider 450 against the authorization list. Authenticator 480 determines that the source IP address is not included in the authorization list. Authenticator 480 communicates to network resource provider 440 that authenticity has not been established. The access request is denied by network resources provider 440. In one implementation, network resource user 460*c* may be given the opportunity to enter secondary verification information in the manner described above in Ex. 3. Upon failure to verify, the access request is denied and no user session is established.

Example 5

In yet another exemplary implementation, illustrated in Ex. 5, network resource user 460*a* uses a network device 410*d* on a network 420*d*, for example, from a hotel room during business travel, that is not LAN 420*a*, ISP (subnetted) network 420*b*, or any other network associated with the established authorization list, to transmit an access request to web site 470 associated with network resource provider 440. However, during an authorized user session in advance of transmitting the request, network resource user 460*a* disabled the authentication functionality for an indefinite or predetermined period, such that web site 470 is accessible from source IP addresses not on the established authorization list. With authentication processes bypassed, network resource user 460*b* then may proceed to log into the account by entering valid login information to thereby establish a user session providing account access.

CONCLUSION

Implementations consistent with principles of the invention provide for enhanced network account security by managing client device requests for accessing network resources based on authentication using the network address from which access is requested. In addition to source authentication, processes such as login information validation and secondary security information verification may be used. Accordingly, authenticator systems consistent with principles of the invention provide substantially improved security over relying solely upon typical login procedures.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while a series of operations has been disclosed with regard to FIG. 3, the order of the operations may be varied in other implementations consistent with principles of the present invention. Furthermore, non-dependent operations may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit (ASIC) or a field programmable gate array, software, or a combination of hardware and software. While aspects have been described in terms of processing messages or packets, these aspects may operate upon any type or form of data, including packet data and non-packet data. The term "data unit" may refer to packet or non-packet data.

No element, operation, or instruction used in description of the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   maintaining, in a storage device of a server, network address information associated with a network resource user;
   receiving, at the server, a request to authenticate the network resource user, the request including a network address identifier;
   authenticating, by the server, the network resource user based on the network address information and the network address identifier;
   sending, by the server and based on the authenticating, a response to the request, the response indicating an authenticity of the network resource user;
   denying, by the server and when the authenticity of the network resource user is not established, the request to authenticate the network resource user;
   requesting, by the server and when the request to authenticate the network resource user is denied, verification information from the network resource user;
   receiving, by the server, the verification information;
   determining, by the server, a validity of the verification information;
   overriding, by the server and when the validity of the verification information is established, the denial of the request to authenticate the network resource user; and
   modifying, by the server and when the denial of the request to authenticate the network resource user is overridden, the network address information to indicate the authenticity of the network address identifier.

2. The method of claim 1, where maintaining network address information comprises maintaining at least one discrete range of network addresses associated with the network resource user.

3. The method of claim 2, where authenticating comprises selectively establishing an authenticity of the network resource user when the network address identifier is included in the at least one discrete range.

4. The method of claim 1, where receiving the verification information comprises receiving voice data.

5. The method of claim 1, where receiving the verification information comprises receiving biometric data.

6. The method of claim 1, further comprising sending a message to the network resource user that includes the validity determination.

7. A method comprising:
   establishing, in a storage device of a server, an authorization list including at least one network address, the authorization list being associated with at least one network resource;
   receiving, at the server, a request to access the at least one network resource, where the request includes a source network address;
   providing, by the server and when the source network address is included in the authorization list, access to the at least one network resource;
   restricting, by the server and when the source network address is not included in the authorization list, access to the at least one network resource;
   requesting, by the server and based on the restricted access, verification information associated with the at least one network resource be provided to the server;
   determining, by the server, whether provided verification information, responsive to the request, is valid;
   maintaining, by the server and upon a determination that the provided verification information is invalid, the access restriction to the at least one network resource;
   overriding, by the server and upon a determination that the provided verification information is valid, the access restriction to the at least one network resource;
   providing, by the server and based on the overridden access restriction, access to the at least one network resource; and
   adding, by the server and upon the access to the at least one network resource being provided, the source network address to the authorization list.

8. The method of claim 7, where establishing the authorization list comprises including at least one discrete range of network addresses associated with the at least one network resource.

9. The method of claim 7, further comprising revising the authorization list by:
   adding at least one additional network address, or
   removing the at least one network address.

10. The method of claim 7, where establishing the authorization list comprises adding, to the authorization list, at least one source network address that has been previously used to access the at least one network resource.

11. The method of claim 7, where establishing the authorization list comprises designating a network entity for which associated network addresses are identifiable.

12. The method of claim 7, where the at least one network address is authorized for prescribed periods.

13. The method of claim 12, where the prescribed periods comprise at least one day of the week, at least one time of day, or both.

14. The method of claim 7, where controlling access comprises:
   receiving login information; and
   permitting access to the at least one network resource based on the login information, the authorization list, and the source network address.

15. An apparatus comprising:
   a server to:
      pre-authorize at least one network address to connect to the server;
      receive a request, from a client device having a source address, to connect to the server;
      determine whether the source address matches the at least one network address that has been pre-authorized to connect to the server;
      grant the request based on the determination that the source address matches the at least one network address that has been pre-authorized;
      deny the request based on the determination that the source address does not match the at least one network address that has been pre-authorized;
      obtain, based on the denied request, verification information from a user of the client device;
      determine whether, responsive to the request, the obtained verification information is valid;
      maintain the denied request based upon a determination that the obtained verification information is invalid;
      override the denied request based upon a determination that the obtained verification information is valid;
      allow, based on the overridden denied request, the client device to connect to the server; and designate, upon the connection being allowed, the source address as being pre-authorized to connect to the server.

16. The apparatus of claim 15, where the at least one network address comprises a discrete range of network addresses.

17. The apparatus of claim 15, where the server is further to:
receive login information; and
selectively grant the request further based on the received login information.

18. The apparatus of claim 15, where the server is further to:
pre-authorize the at least one network address, when the at least one network address has been previously used to connect to the server.

19. A system comprising:
means for receiving, from a client device having a dynamically assigned source network address from a range of network addresses, a request for connection to a network resource;
means for selectively authenticating the source network address, where the source network address is compared to a list of authorized network addresses;
means for connecting an authenticated source network address to the network resource;
means for restricting access to the network resource when the source network address is not on the list of authorized network addresses;
means for sending, to the client device and when the access is restricted, a response to the request indicating that access to the network resource is restricted and requesting verification information to override the access restriction;
means for receiving the verification information;
means for determining a validity of the received verification information;
means for overriding, when the validity of the received verification information is established, the access restriction; and
means for adding, when the access restriction is overridden, the source network address to the list of authorized network addresses.

* * * * *